(12) United States Patent
Uchida

(10) Patent No.: US 8,351,132 B2
(45) Date of Patent: Jan. 8, 2013

(54) IMAGE PICKUP OPTICAL SYSTEM AND IMAGE PICKUP APPARATUS USING THE SAME

(75) Inventor: Yoshihiro Uchida, Akishima (JP)

(73) Assignee: Olympus Corporation, Tokyo (JP)

( * ) Notice: Subject to any disclaimer, the term of this patent is extended or adjusted under 35 U.S.C. 154(b) by 160 days.

(21) Appl. No.: 12/932,699

(22) Filed: Mar. 2, 2011

(65) Prior Publication Data

US 2011/0228409 A1    Sep. 22, 2011

(30) Foreign Application Priority Data

Mar. 18, 2010   (JP) ................. 2010-062595

(51) Int. Cl.
*G02B 13/18*   (2006.01)
*G02B 9/34*    (2006.01)
*G02B 9/60*    (2006.01)

(52) U.S. Cl. ........ 359/714; 359/715; 359/764; 359/772; 359/773; 359/774

(58) Field of Classification Search ............. 359/714, 359/715, 774–776
See application file for complete search history.

(56) References Cited

U.S. PATENT DOCUMENTS

| 7,248,421 B2 * | 7/2007 | Amanai | 359/773 |
| 7,549,809 B2 * | 6/2009 | Isono | 396/439 |

FOREIGN PATENT DOCUMENTS

| JP | 2007-264180 | 10/2007 |
| JP | 4317933 | 6/2009 |

* cited by examiner

*Primary Examiner* — Scott J Sugarman
(74) *Attorney, Agent, or Firm* — Kenyon & Kenyon LLP

(57) ABSTRACT

An image pickup optical system having five lenses includes in order from an object side, a first lens having a biconvex shape, and a positive refractive power, a second lens having a negative refractive power, a third lens having a meniscus shape with a concave surface thereof directed toward the object side, and a negative refractive power, a fourth lens having a meniscus shape with a concave surface thereof directed toward the object side, and a positive refractive power, and a fifth lens having a negative refractive power. The third lens and the fourth lens are cemented, and the negative refractive power at a central portion of the third lens increases gradually toward a peripheral portion thereof, and the positive refractive power at a central portion of the fourth lens decreases gradually toward a peripheral portion thereof. A cemented surface of the third lens and the fourth lens is an aspheric surface, and the cemented surface becomes a concave surface all the time with respect to the object side, at the central portion and the peripheral portion.

12 Claims, 17 Drawing Sheets

US 8,351,132 B2

IMAGE PICKUP OPTICAL SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2010-62595 filed on Mar. 18, 2010; the entire contents of which are incorporated herein by reference.

BACKGROUND OF THE INVENTION

1. Field of the Invention

The present invention relates to an image pickup optical system and an image pickup apparatus using the same.

2. Description of the Related Art

In recent years, with the thinning of equipments such as a mobile telephone, a portable terminal, and a personal computer, a camera module in which, a length of an optical system in an optical axial direction is thinned to the minimum has been sought. In order to fulfill the requirement, a large number of optical systems with a single focal length, which include about two to three aspheric lenses, have been proposed.

Moreover, in recent years, with the technological development of an image pickup element and the increasing needs of the market, a camera module which is small as well as has a large number of pixels, wide angle, and low-cost, has been sought. As an optical system in which, shortening of an overall length of the optical system is facilitated while improving an image forming performance, an optical system proposed in Japanese Patent No. 4317933 and an optical system proposed in Japanese Patent Application Laid-open Publication No. 2007-264180, in which, the number of lenses is let to be four to five, are available.

SUMMARY OF THE INVENTION

An image pickup optical system according to the present invention, is an optical system having five lenses, and includes in order from an object side a first lens having a biconvex shape, and a positive refractive power, a second lens having a negative refractive power, a third lens having a meniscus shape with a concave surface thereof directed toward the object side, and a negative refractive power, a fourth lens having a meniscus shape with a concave surface thereof directed toward the object side, and a positive refractive power, and a fifth lens having a negative refractive power, and the third lens and the fourth lens are cemented, and the negative refractive power at a central portion of the third lens increases gradually toward a peripheral portion thereof, and the positive refractive power at a central portion of the fourth lens decreases gradually toward a peripheral portion thereof, and a cemented surface of the third lens and the fourth lens is an aspheric surface, and the cemented surface becomes a concave surface at whole area of the surface with respect to the object side, at the central portion and the peripheral portion.

DETAILED DESCRIPTION OF THE INVENTION

Figure 1:
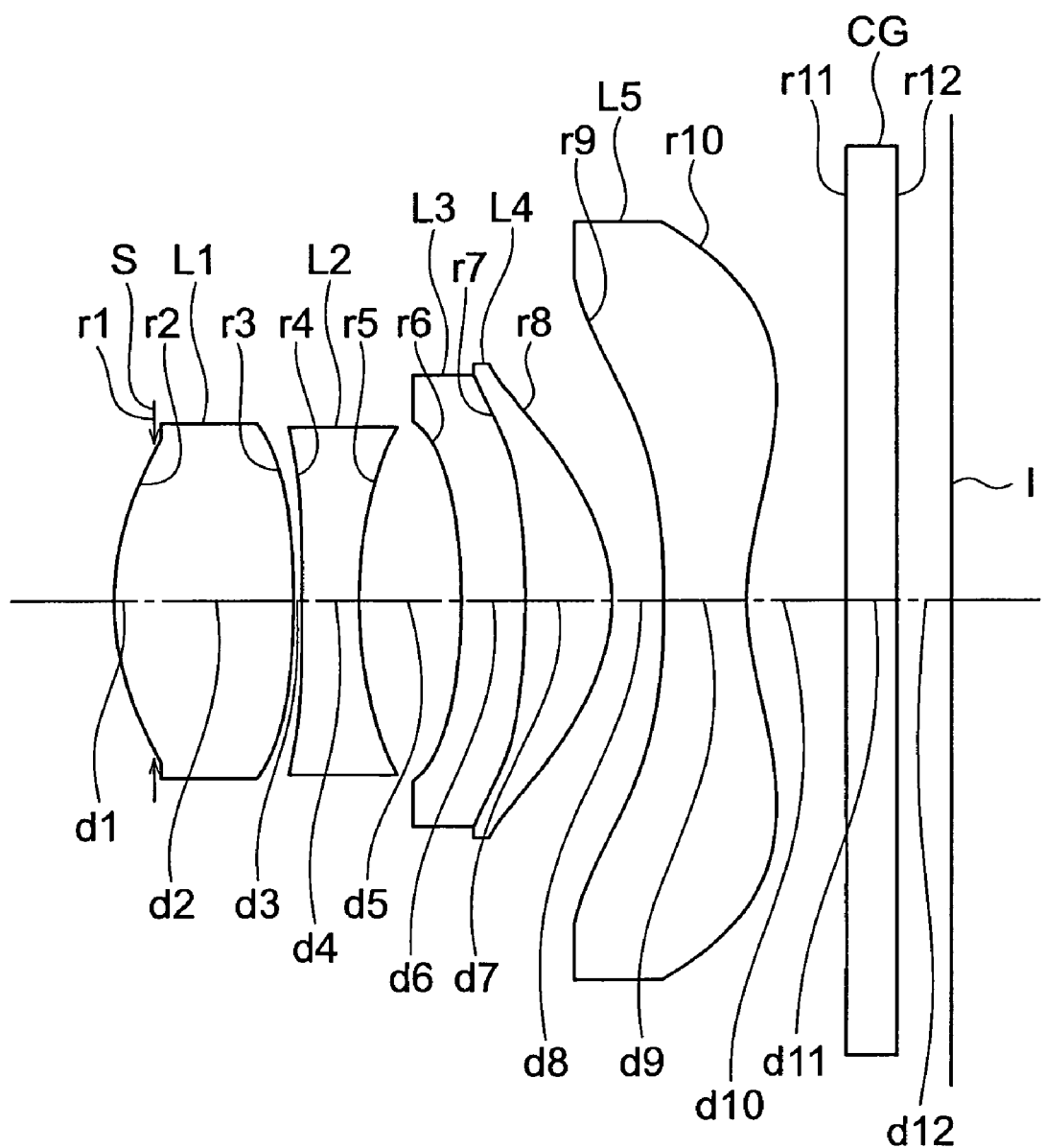
FIG. 1 is a cross-sectional view along an optical axis showing an optical arrangement at the time of infinite object point focusing according to a first embodiment of an image pickup optical system of the present invention.

Prior to description of embodiments, an action and an effect of an image pickup optical system according to the present invention will be described below.

An image pickup optical system having five lenses, includes in order from an object side a first lens having a biconvex shape, and a positive refractive power, a second lens having a negative refractive power, a third lens having a meniscus shape with a concave surface thereof directed toward the object side, and a negative refractive power, a fourth lens having a meniscus shape with a concave surface thereof directed toward the object side, and a positive refractive power, and a fifth lens having a negative refractive power, and the third lens and the fourth lens are cemented, and the negative refractive power at a central potion of the third lens increases gradually toward a peripheral portion thereof, and the positive refractive power at a central portion of the fourth lens decreases gradually toward a peripheral portion thereof, and a cemented surface of the third lens and the fourth lens is an aspheric surface, and the cemented surface becomes a concave surface at whole area of the surface with respect to the object side, at the central portion and the peripheral portion.

By the abovementioned arrangement of the five lenses, it is possible to position of a principal point on the object side. Accordingly, it is possible to make an overall length sufficiently short with respect to a focal length. Consequently, it is possible to realize shortening of the overall length of the image pickup optical system.

Moreover, the third lens and the fourth lens are cemented. By disposing the cemented lens of the third lens and the fourth lens at an intermediate position of (at a position between) a diaphragm and an image plane, it is possible to correct a chromatic aberration of magnification appropriately.

Further, the negative refractive power at the central portion of the third lens increases gradually toward the peripheral portion thereof and the positive refractive power at the central portion of the fourth lens decreases gradually toward the peripheral portion thereof. Accordingly, it is possible to correct the chromatic aberration of magnification and a curvature of field for which, an image point at the peripheral portion is positioned on an object side.

Moreover, an arrangement is made such that the cemented surface of the third lens and the fourth lens is an aspheric surface, and the cemented surface becomes a concave surface at whole area of the surface with respect to the object side, at the central portion and the peripheral portion. Accordingly, it is possible to suppress an angle of incidence of light rays on a surface on the object side and an image side, and to correct favorably a coma aberration and an astigmatism.

According to a preferable aspect of the present invention, it is desirable that the image pickup optical system satisfies the following conditional expression (A).

$$|v3-v4|>20 \quad (A)$$

where, v3 denotes Abbe's number (nd3−1)/(nF3−nC3) for the third lens, v4 denotes Abbe's number (nd4−1)/(nF4−nC4) for the fourth lens, where, nd3, nC3, and nF3 denote refractive indices for a d-line, a C-line, and an F-line respectively of the third lens, and nd4, nC4, and nF4 denote refractive indices for the d-line, the C-line, and the F-line respectively of the fourth lens.

Conditional expression (A) is a relational expression with respect to Abbe's number for the third lens and the fourth lens.

By satisfying conditional expression (A), it is possible to correct chromatic aberration favorably.

According to a preferable aspect of the present invention, it is desirable that the image pickup optical system satisfies the following conditional expression (1).

$$2.5 < |f3/f4| < 100 \quad (1)$$

where, f3 denotes a focal length of the third lens, and f4 denotes a focal length of the fourth lens.

Conditional expression (1) regulates a ratio of the focal length of the negative lens and the focal length of the positive lens in the cemented lens. By satisfying conditional expression (1), it is possible to shorten the overall length of the image pickup optical system, and to carry out a favorable aberration correction.

When an upper limit value in conditional expression (1) is surpassed, since the refractive power of the negative lens becomes small, it is not possible to correct the chromatic aberration sufficiently.

When a lower limit value in conditional expression (1) is surpassed, a combined focal length of the third lens and the fourth lens becomes increases. Therefore, the overall length cannot be made short.

In a case of shortening the overall length, the refractive power of the first lens is to be made large. In this case, since there is an increase in the coma aberration, the aberration correction becomes difficult.

According to a preferable aspect of the present invention, it is desirable that a diaphragm is disposed nearest to the object side of the image pickup optical system.

By disposing the diaphragm nearest to the object side, it is possible to move away an exit pupil from an image plane. Accordingly, an angle of light rays incident on a peripheral portion of an image pickup element becomes small. Therefore, it becomes possible to avoid to decrease in an amount of light in the peripheral area of the image pickup element According to a preferable aspect of the present invention, it is desirable that the image pickup optical system satisfies the following conditional expression (2).

$$0.4 < f1/f34 < 2.5 \quad (2)$$

wherein, f34 denotes a combined focal length of the third lens and the fourth lens, and f1 denotes the focal length of the first lens.

When an upper limit value in conditional expression (2) is surpassed, the refractive power of the first lens becomes small. In this case, it becomes difficult to position the position of the principal point on the object side of the image pickup optical system. For this reason, the shortening of the overall length becomes difficult.

By making small the refractive power of the second lens, it is possible to shorten the overall length. However, in this case, since the chromatic aberration increases, it becomes difficult to secure the optical performance.

When a lower limit value in conditional expression (2) is surpassed, the refractive power of the first lens becomes large. In this case, particularly, the coma aberration and the spherical aberration increase as there is an increase in a marginal ray height. Namely, these aberrations correction becomes difficult. Moreover, since the refractive power of the overall image pickup optical system is concentrated in the first lens, the sensitivity of manufacturing error becomes large. Therefore, it is not preferable to surpass the lower limit value of conditional expression (2).

According to a preferable aspect of the present invention, it is desirable that a curvature of the cemented surface of the third lens and the fourth lens which are cemented is a shape which increases toward the peripheral portion as compared to a paraxial region. Namely, the shape of cemented surface of the cemented lens has such a shape of curvature.

By such an arrangement, it is possible to suppress the angle of incidence of light rays on the surface on the object side and the image side. As a result of this, it is possible to correct the coma aberration and astigmatism more favorably.

Moreover, according to a preferable aspect of the present invention, it is desirable that the cemented surface of the third lens and the fourth lens which are cemented has a point of inflection.

By such an arrangement, it is possible to suppress the angle of incidence of light rays on the surface on the object side and the image side. As a result of this, it is possible to correct the coma aberration and the astigmatism more favorably.

According to a preferable aspect of the present invention, it is desirable that the image pickup optical system satisfies the following conditional expression (3).

$$0.75<(r6+r8)/(r6-r8)<4.0 \qquad (3)$$

where, r6 denotes a radius of curvature of a surface on the object side of the third lens, and r8 denotes a radius of curvature of a surface on an image side of the fourth lens.

Conditional expression (3) regulates a condition for suppressing the angle of incidence of light rays on a surface on the object side of the third lens and a surface on the image side of the fourth lens, and correcting coma aberration favorably, as well as for realizing the shortening while maintaining a telecentricity of the image pickup optical system.

When an upper limit value in the conditional expression (3) is surpassed, by a negative curvature of the surface on the object side of the third lens and the surface on the image side of the fourth lens becoming excessively small. In the result, since an angle of incidence of an off-axis light beam on the surface on the object side of the third lens and the surface on the image side of the fourth lens become steep, the correction of coma aberration becomes difficult.

When a lower limit value in conditional expression (3) is surpassed, by the negative curvature of the surface on the image side of the fourth lens becoming excessively large, accordingly, an angle of emergence from the fourth lens becomes small. Therefore, it becomes difficult to achieve the shortening of the overall length of the image pickup optical system and securing of the telecentricity simultaneously.

For achieving both, that is, the shortening of the overall length of the image pickup optical system as well as the telecentricity, making an angle of emergence from the second lens large can also be taken into consideration. However, when the angle of emergence from the second lens is made large, the coma aberration increases, and the performance is degraded.

According to a preferable aspect of the present invention, it is desirable that the image pickup optical system satisfies the following conditional expression (4).

$$0.3<f1/f<1.4 \qquad (4)$$

where, f1 denotes a focal length of the first lens, and f denotes a focal length of the overall image pickup optical system.

Conditional expression (4) regulates a preferable conditional for shortening the overall length of the image pickup optical system and for favorable aberration correction.

When an upper limit value in conditional expression (4) is surpassed, the refractive power of the first lens becomes small, and it becomes difficult to position the position of the principal point on the object side of the image pickup optical system. Therefore, the shortening of the overall length becomes difficult.

When a lower limit value in condition expression (4) is surpassed, the refractive power of the first lens becomes large, particularly, the marginal ray height, increase. Therefore, since there is an increase in the coma aberration and the spherical aberration, the aberration correction becomes difficult. Moreover, the refractive power of the overall image pickup optical system is concentrated in the first lens. Therefore, the sensitivity of manufacturing error becomes large, which is not preferable.

According to a preferable aspect of the present invention, it is desirable that the image pickup optical system satisfies the following conditional expression (5).

$$0.25<|f5/f|<1.15 \qquad (5)$$

where, f5 denotes a focal length of the fifth lens, and f denotes the focal length of the overall image pickup optical system.

Conditional expression (5) regulates a condition for securing a sufficient back focal length while ensuring the optical performance and shortening the overall length of the image pickup optical system.

When an upper limit value in conditional expression (5) is surpassed, since the negative refractive power of the fifth lens becomes small, it becomes difficult to secure the back focal length sufficiently. Furthermore, correction of the distortion and the curvature of field becomes difficult.

When a lower limit value in conditional expression (5) is surpassed, since the negative refractive power of the fifth lens becomes large, the shortening of the overall length of the image pickup optical system becomes difficult. In this case, for shortening the overall length of the image pickup optical system, the refractive power of the first lens and the third lens is to be increased. However, when the refractive power of the first lens and the third lens is increased, the correction of an oblique aberration such as the curvature of field becomes difficult.

According to a preferable aspect of the present invention, it is desirable that the image pickup optical system satisfies the following conditional expression (6).

$$0.4<d5/TL<1.8 \qquad (6)$$

where,

TL denotes a distance on an optical axis, from a vertex of a surface on the object side of the first lens up to a vertex of a surface on an image side of the fifth lens, and d5 denotes an air space on the optical axis, between the second lens and the third lens.

When a lower limit value in conditional expression (6) is surpassed, a difference in heights of light rays of off-axis light beam at the second lens and the third lens becomes small. Therefore, an effect of the third lens which has an important role in the correction of the distortion and the correction of the curvature of field of high order becomes small, and the correction becomes difficult.

When an upper limit value in conditional expression (6) is surpassed, although being able to secure the widening of the off-axis light beam incident on the third lens, however, the overall length of the image pickup optical system becomes increases.

Moreover, according to an image pickup apparatus of the present invention, it is desirable that the image pickup apparatus includes the abovementioned image pickup optical system, and an electronic image pickup element having an image pickup surface, and the image pickup optical system has an auto-focus mechanism integrated therein.

By installing the auto-focus mechanism, it is possible to focus at all object distances.

According to a preferable aspect of the present invention, it is desirable that the image pickup optical system and the electronic image pickup element are integrated.

By integrating the electronic image pickup element, it is possible to convert an optical image captured by the image pickup optical system to an electric signal. Moreover, by selecting an electronic image pickup element which is capable of reducing a change (difference) in a brightness of an image in a central portion and a peripheral portion of the image by (due to) αi, it is possible to provide an image pickup apparatus having a small size and an improved performance.

Exemplary embodiments of an image pickup optical system and an image pickup apparatus according to the present invention will be described below in detail by referring to the accompanying diagrams. However, the present invention is not restricted to the embodiments described below.

To start with, an image pickup optical system according to a first embodiment of the present invention will be described below. FIG. 1 is a cross-sectional view along an optical axis showing an optical arrangement at the time of infinite object point focusing of the image pickup optical system according to the first embodiment.

Figure 2:
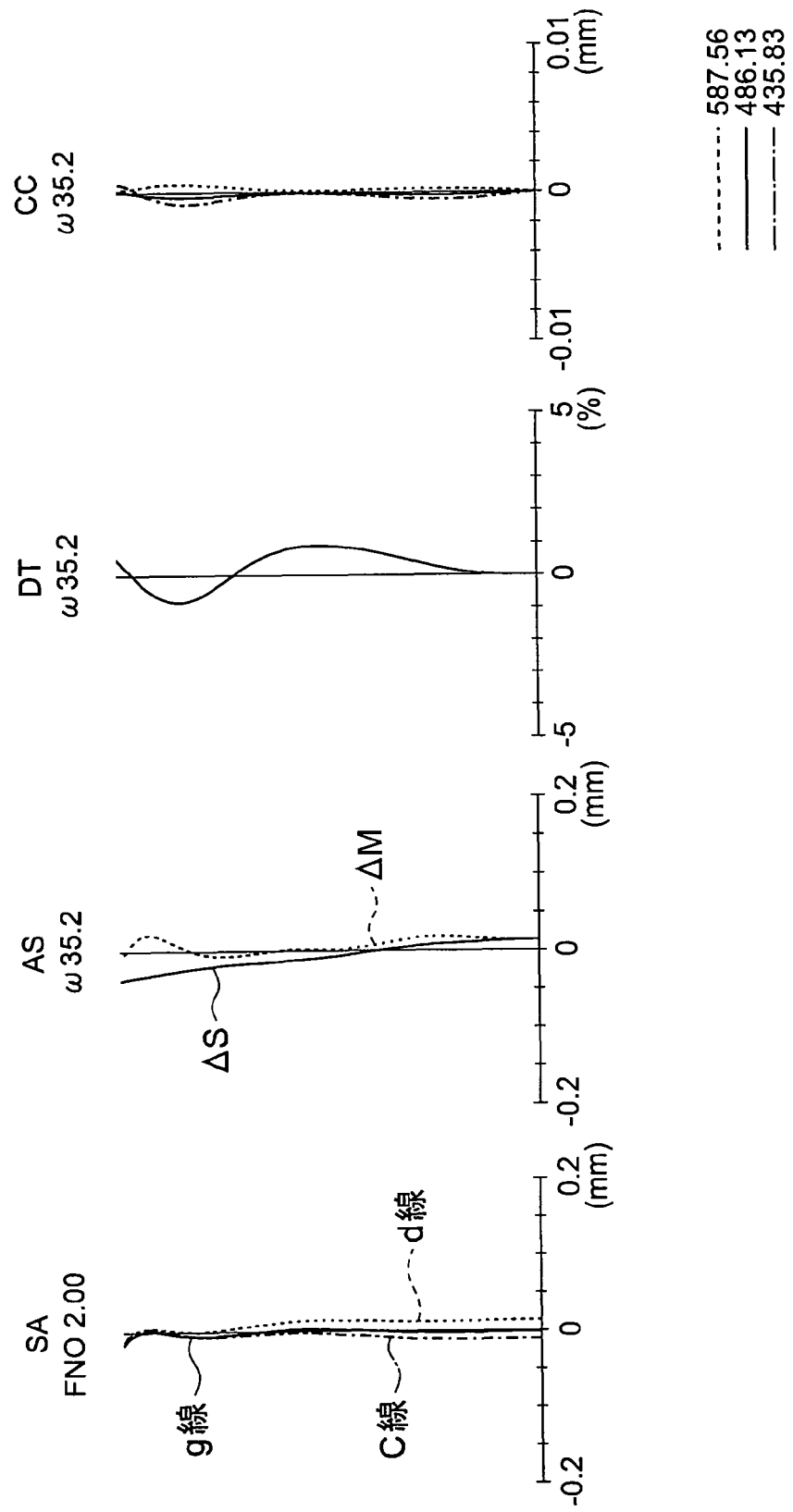
FIG. 2 is a diagram showing a spherical aberration, an astigmatism, a distortion, and a chromatic aberration of magnification at the time of infinite object point focusing of the image pickup optical system according to the first embodiment.

FIG. 2 is a diagram showing a spherical aberration (SA), an astigmatism (AS), a distortion (DT), and a chromatic aberration of magnification (CC) at the time of infinite object point focusing of the image pickup optical system according to the first embodiment. Moreover, FNO denotes an F number and ω denotes a half angle of field. Symbols in aberration diagrams are same in the embodiments that will be described later.

The image pickup optical system of the first embodiment having five lenses, as shown in FIG. 1, includes in order from an object side, an aperture stop S, a first lens L1 having a biconvex shape and a positive refractive power, a second lens L2 having a negative refractive power, a third lens L3 having a meniscus shape with a concave surface thereof directed toward the object side, and a negative refractive power, a fourth lens L4 having a meniscus shape with a concave surface thereof directed toward the object side, and a positive refractive power, and a fifth lens having a negative refractive power. The third lens L3 and the fourth lens L4 are cemented.

In all of the embodiments that will be described below, in lens cross-sectional views, CG denotes a cover glass, and I denotes an image pickup surface of an electronic image pickup element.

The first lens L1 is a biconvex positive lens. The second lens L2 is a biconcave negative lens. The third lens L3 is a negative meniscus lens having a concave surface directed toward the object side. The fourth lens L4 is a positive meniscus lens having a concave surface directed toward the object side. The fifth lens L5 is a biconcave negative lens.

An aspheric surface is provided to both surfaces of all the five lenses namely, the first lens L1, the second lens L2, the third lens L3, the fourth lens L4, and the fifth lens L5 (hereinafter, 'the first lens L1 to the fifth lens L5').

Figure 3:
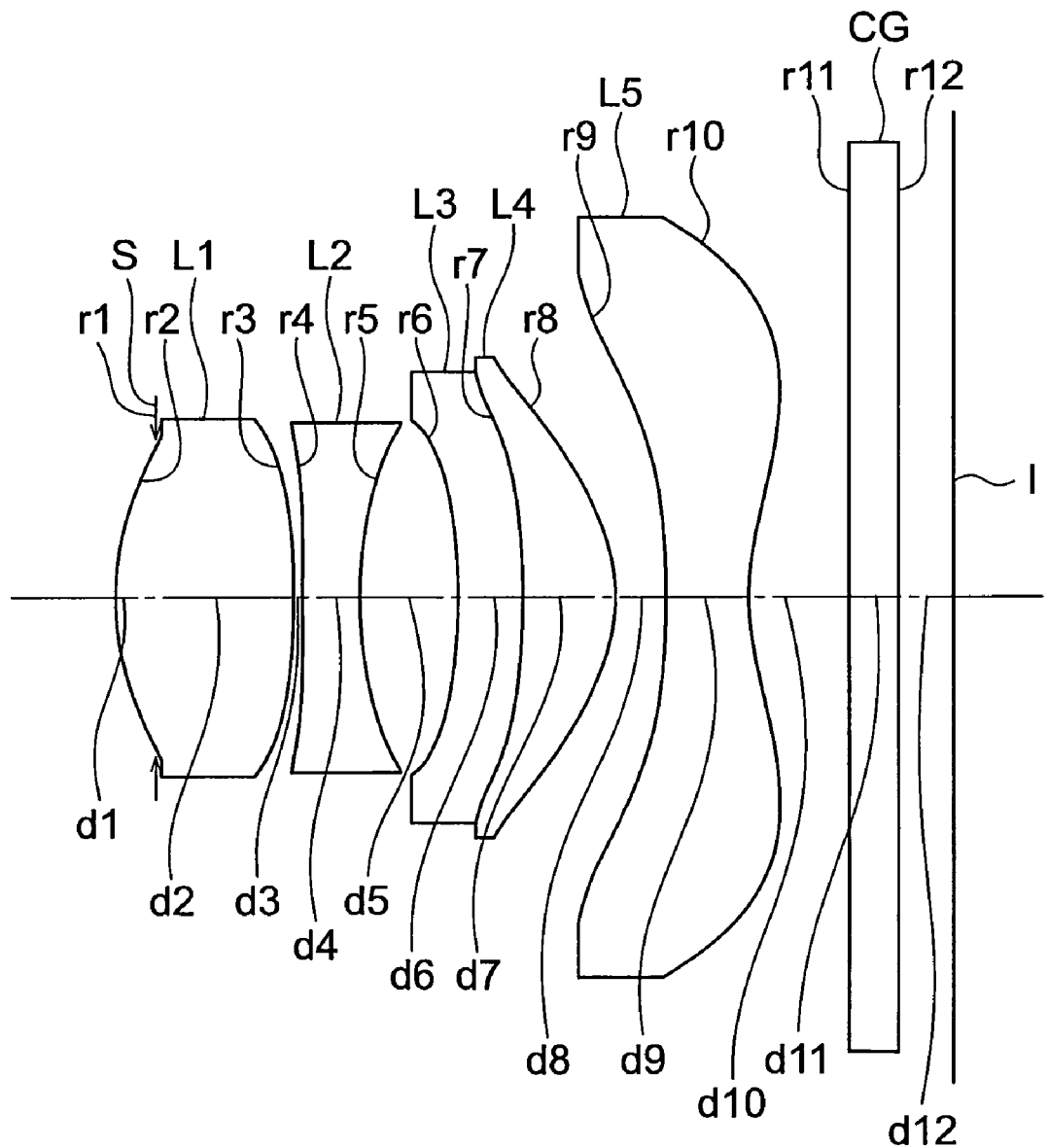
FIG. 3 is a cross-sectional view along an optical axis showing an optical arrangement at the time of infinite object point focusing according to a second embodiment of an image pickup optical system of the present invention.
Figure 4:
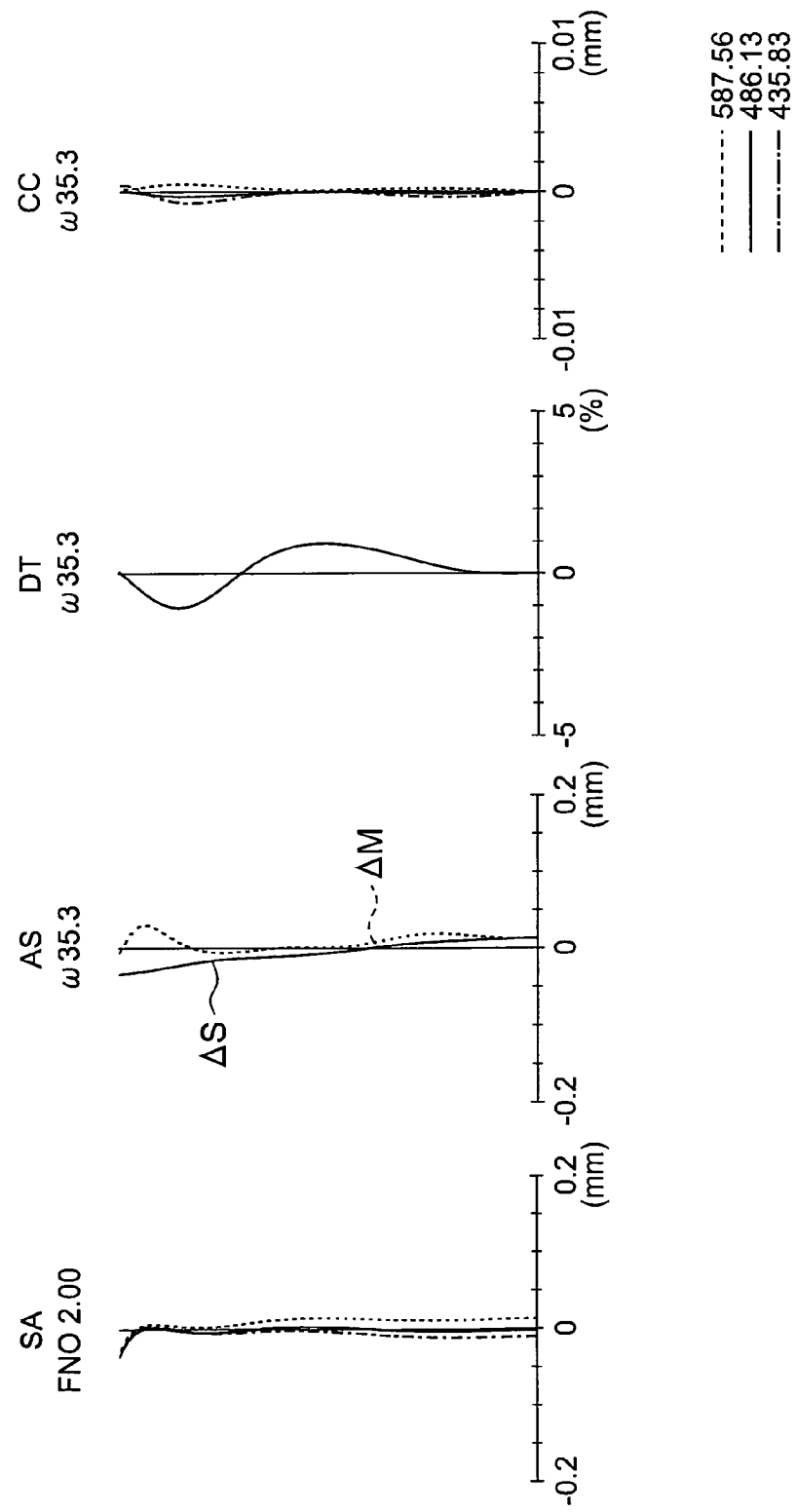
FIG. 4 is a diagram showing a spherical aberration, an astigmatism, a distortion, and a chromatic aberration of magnification at the time of infinite object point focusing of the image pickup optical system according to the second embodiment.

An image pickup optical system of a second embodiment having five lenses, as shown in FIG. 3, includes in order from an object side, an aperture stop S, a first lens L1 having a biconvex shape and a positive refractive power, a second lens L2 having a negative refractive power, a third lens L3 having a meniscus shape with a concave surface thereof directed toward the object side, and a negative refractive power, a fourth lens L4 having a meniscus shape with a concave surface thereof directed toward the object side, and a positive refractive power, and a fifth lens L5 having a negative refractive power. The third lens L3 and the fourth lens L4 are cemented.

The first lens L1 is a biconvex positive lens. The second lens L2 is a negative meniscus lens having a convex surface directed toward the object side. The third lens L3 is a negative meniscus lens having a concave surface directed toward the object side. The fourth lens L4 is a positive meniscus lens having a concave surface directed toward the object side. The fifth lens L5 is a biconcave negative lens.

An aspheric surface is provided to both surfaces of all the five lenses namely, the first lens L1 to the fifth lens L5.

Figure 5:
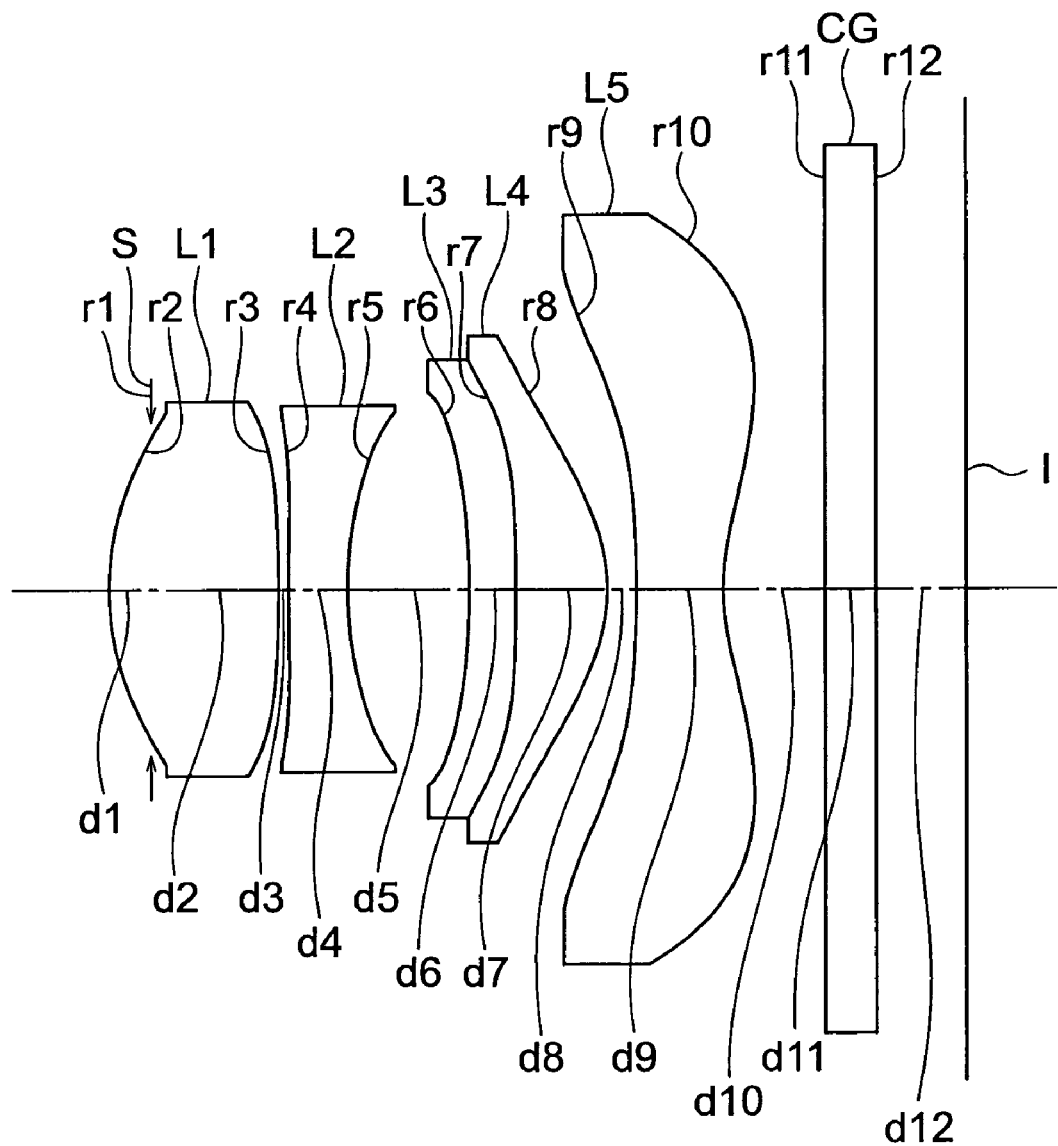
FIG. 5 is a cross-sectional view along an optical axis showing an optical arrangement at the time of infinite object point focusing according to a third embodiment of an image pickup optical system of the present invention.
Figure 6:
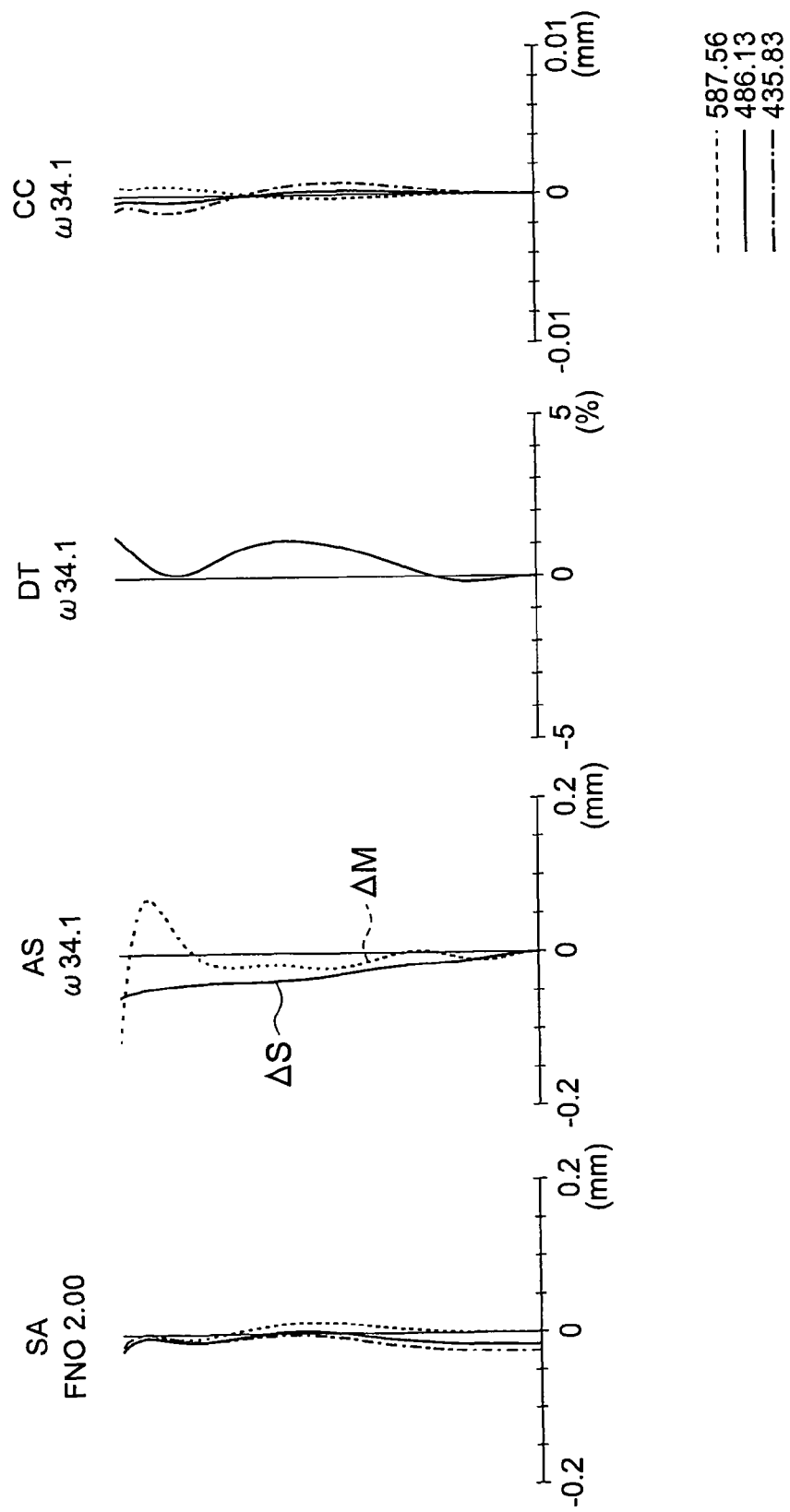
FIG. 6 is a diagram showing a spherical aberration, an astigmatism, a distortion, and a chromatic aberration of magnification at the time of infinite object point focusing of the image pickup optical system according to the third embodiment.

An image pickup optical system of a third embodiment having five lenses, as shown in FIG. 5, includes in order from an object side, an aperture stop S, a first lens L1 having a biconvex shape and a positive refractive power, a second lens L2 having a negative refractive power, a third lens L3 having a meniscus shape with a concave surface thereof directed toward the object side, and a negative refractive power, a fourth lens L4 having a meniscus shape with a concave surface thereof directed toward the object side, and a positive refractive power, and a fifth lens L5 having a negative refractive power. The third lens L3 and the fourth lens L4 are cemented.

The first lens L1 is a biconvex positive lens. The second lens L2 is a negative meniscus lens having a convex surface directed toward the object side. The third lens L3 is a negative meniscus lens having a concave surface directed toward the object side. The fourth lens L4 is a positive meniscus lens having a concave surface directed toward the object side. The fifth lens L5 is a biconcave negative lens.

An aspheric surface is provided to both surfaces of all the five lenses namely, the first lens L1 to the fifth lens L5.

Figure 7:
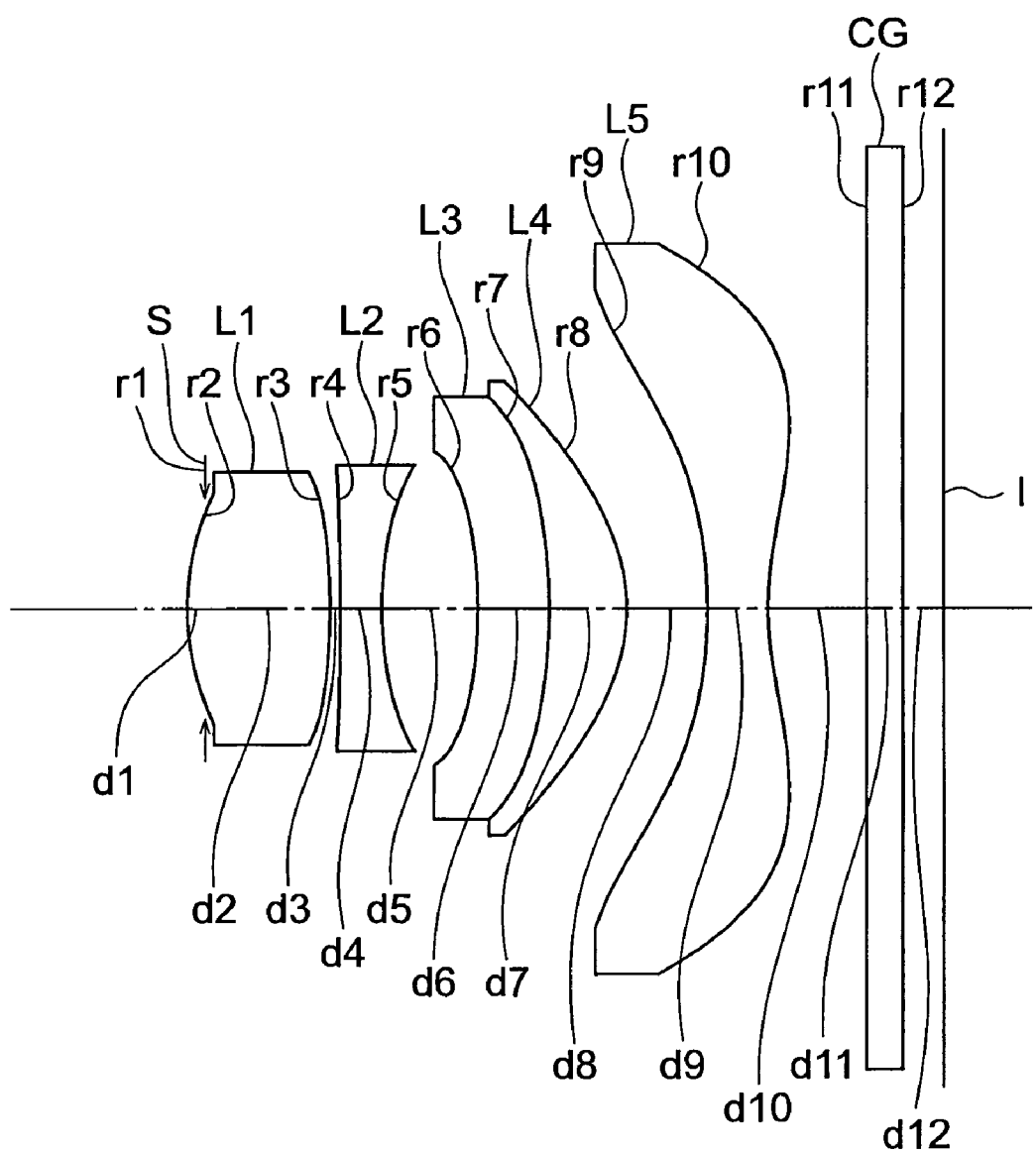
FIG. 7 is a cross-sectional view along an optical axis showing an optical arrangement at the time of infinite object point focusing according to a fourth embodiment of an image pickup optical system of the present invention.
Figure 8:
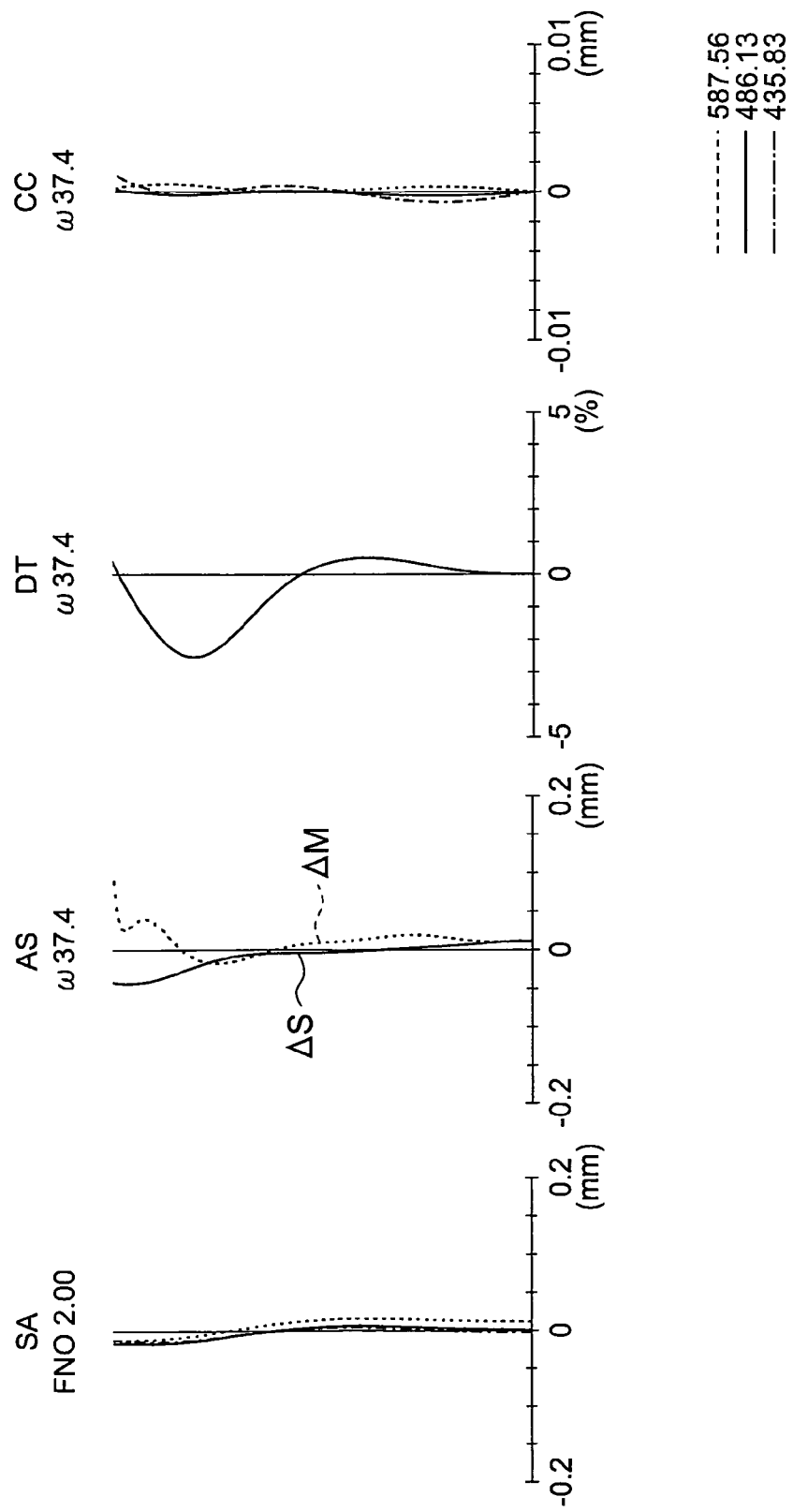
FIG. 8 is a diagram showing a spherical aberration, an astigmatism, a distortion, and a chromatic aberration of magnification at the time of infinite object point focusing of the image pickup optical system according to the fourth embodiment.

An image pickup optical system of a fourth embodiment having five lenses, as shown in FIG. 7, includes in order from an object side, an aperture stop S, a first lens L1 having a biconvex shape and a positive refractive power, a second lens L2 having a negative refractive power, a third lens L3 having a meniscus shape with a concave surface thereof directed toward the object side, and a negative refractive power, a fourth lens L4 having a meniscus shape with a concave surface thereof directed toward the object side, and a positive refractive power, and a fifth lens L5 having a negative refractive power. The third lens L3 and the fourth lens L4 are cemented.

The first lens L1 is a biconvex positive lens. The second lens L2 is a biconcave negative lens. The third lens L3 is a negative meniscus lens having a concave surface directed toward the object side. The fourth lens L4 is a positive meniscus lens having a concave surface directed toward the object side. The fifth lens L5 is a biconcave negative lens.

An aspheric surface is provided to both surfaces of all the five lenses namely, the first lens L1 to the fifth lens L5.

Figure 9:
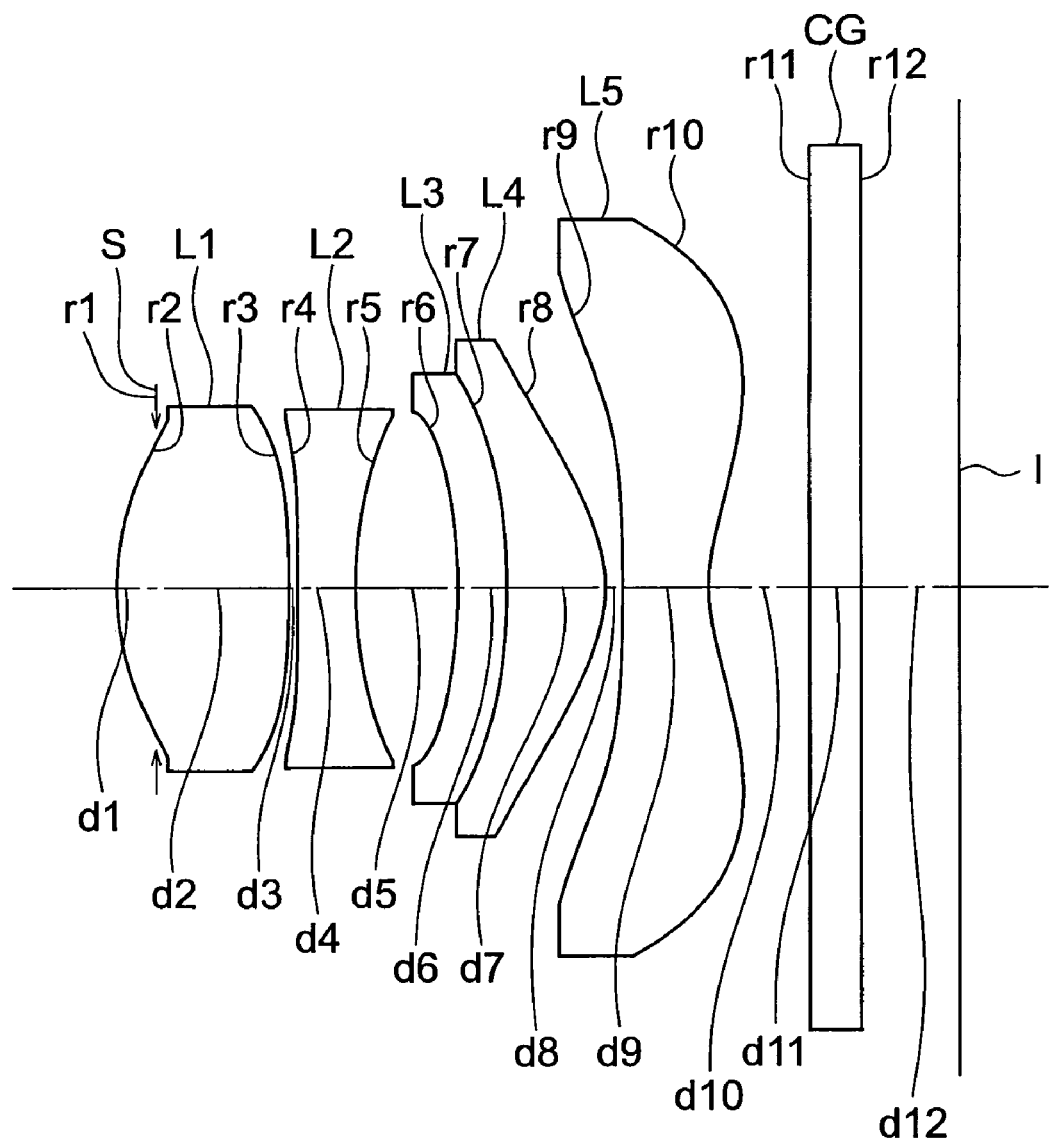
FIG. 9 is a cross-sectional view along an optical axis showing an optical arrangement at the time of infinite object point focusing according to a fifth embodiment of an image pickup optical system of the present invention.
Figure 10:
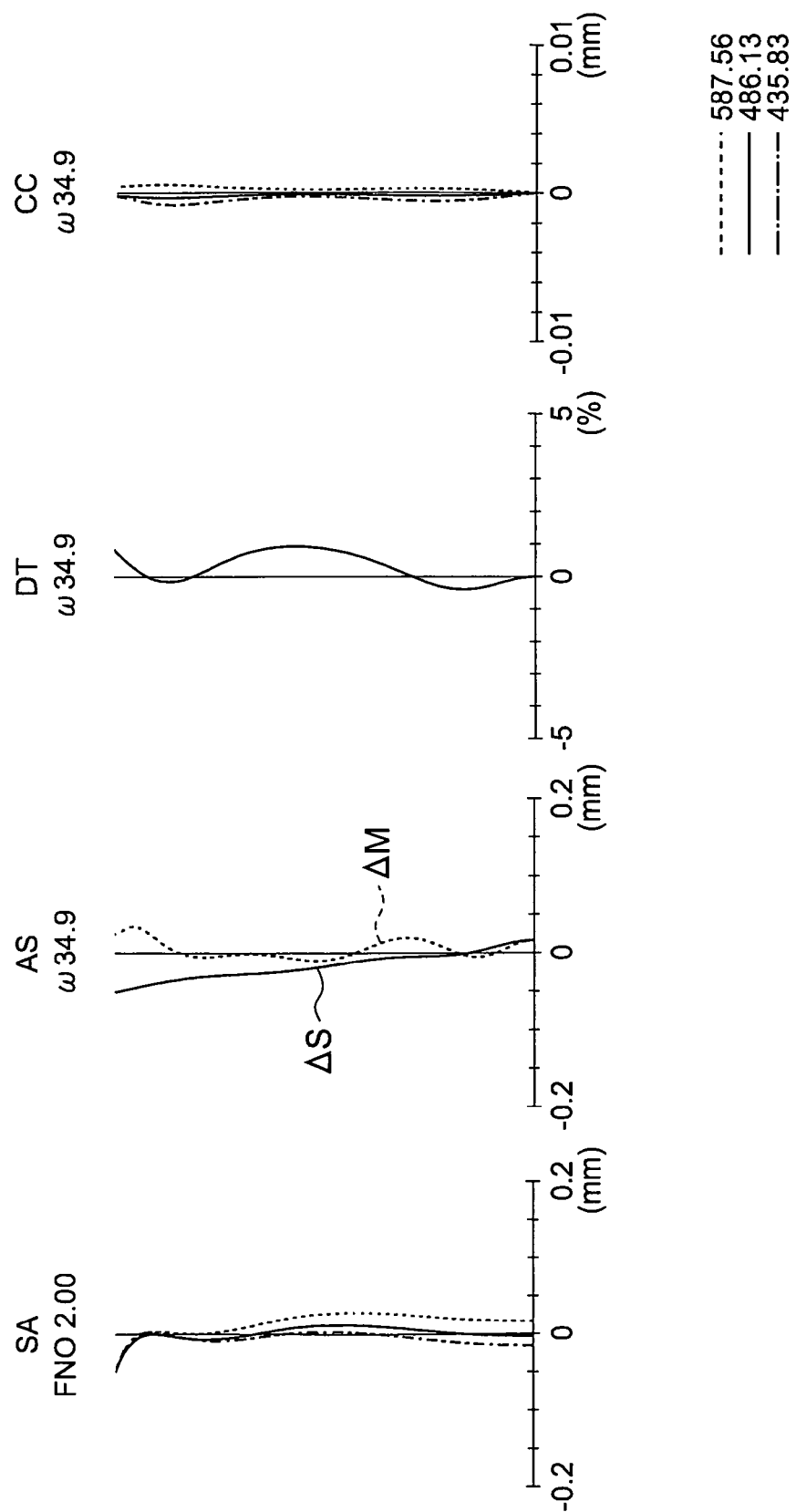
FIG. 10 is a diagram showing a spherical aberration, an astigmatism, a distortion, and a chromatic aberration of magnification at the time of infinite object point focusing of the image pickup optical system according to the fifth embodiment.

An image pickup optical system of a fifth embodiment having five lenses, as shown in FIG. 9, includes in order from an object side, an aperture stop S, a first lens L1 having a biconvex shape and a positive refractive power, a second lens L2 having a negative refractive power, a third lens L3 having a meniscus shape with a concave surface thereof directed toward the object side, and a negative refractive power, a fourth lens L4 having a meniscus shape with a concave surface thereof directed toward the object side, and a positive refractive power, and a fifth lens L5 having a negative refractive power. The third lens L3 and the fourth lens L4 are cemented.

The first lens L1 is a biconvex positive lens. The second lens L2 is a negative meniscus lens having a convex surface directed toward the object side. The third lens L3 is a negative meniscus lens having a concave surface directed toward the object side. The fourth lens L4 is a positive meniscus lens having a concave surface directed toward the object side. The fifth lens L5 is a biconcave negative lens.

An aspheric surface is provided to both surfaces of all the five lenses namely, the first lens L1 to the fifth lens L5.

In the all embodiments, the negative refractive power at the central portion of the third lens L3 increases gradually toward the peripheral portion thereof and the positive refractive power at the central portion of the fourth lens L4 decreases gradually toward the peripheral portion thereof.

Numerical data of each embodiment described above is shown below. Apart from symbols described above, each of r1, r2, . . . denotes radius of curvature of each lens surface, each of d1, d2, . . . denotes a distance between two lenses, each of nd1, nd2, . . . denotes a refractive index of each lens for a d-line, each of vd1, vd2, . . . denotes an Abbe constant for each lens, $F_{NO}$ denotes an F number, f denotes a focal length of the entire zoom lens system, ω denotes a half angle of field, and further, * denotes an aspheric data, S denotes an aperture stop.

When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A6 y^6+A8 y^8+A10 y^{10}+A12 y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e−n' (where, n is an integral number) indicates '$10^{-n}$'.

These symbols are used in common in the following examples.

EXAMPLE 1

| Unit mm | | | | |
|---|---|---|---|---|
| Surface data | | | | |
| Surface no. | r | d | nd | vd |
| Object plane | ∞ | ∞ | | |
| 1(S) | ∞ | −0.24 | | |
| 2* | 1.856 | 1.08 | 1.53367 | 55.87 |
| 3* | −5.955 | 0.05 | | |
| 4* | −14338.301 | 0.35 | 1.61420 | 25.60 |
| 5* | 2.873 | 0.63 | | |
| 6* | −4.131 | 0.39 | 1.61700 | 27.20 |
| 7* | −5.364 | 0.53 | 1.52400 | 50.40 |
| 8* | −1.124 | 0.31 | | |
| 9* | −6.298 | 0.50 | 1.53367 | 55.87 |
| 10* | 1.575 | 0.60 | | |

| Unit mm | | | | |
|---|---|---|---|---|
| 11 | ∞ | 0.30 | 1.51633 | 64.14 |
| 12 | ∞ | 0.34 | | |
| Image plane (Light receiving surface) | ∞ | 0 | | |

Aspherical surface data

2nd surface

K = −0.608
A4 = 5.42282e−03, A6 = −1.32665e−02, A8 = 1.94497e−02,
A10 = −1.91967e−02

3rd surface

K = −1.132
A4 = −4.75171e−02, A6 = −2.13608e−02, A8 = 9.22856e−03,
A10 = −6.73286e−03

4th surface

K = −0.000
A4 = −6.15188e−02, A6 = −1.79612e−02, A8 = 1.89328e−02,
A10 = 1.80698e−03

5th surface

K = −0.638
A4 = 1.51281e−03, A6 = −7.49025e−04, A8 = −4.36510e−03,
A10 = 1.93490e−02, A12 = −5.18466e−03

6th surface

K = 11.806
A4 = −2.53073e−03, A6 = −2.22078e−02, A8 = 9.10678e−03,
A10 = −8.28913e−04

7th surface

K = 12.640
A4 = 6.54414e−03, A6 = −1.76564e−02, A8 = −1.90853e−02,
A10 = 1.30128e−02

8th surface

K = −3.428
A4 = −6.43549e−02, A6 = 1.07122e−02, A8 = −3.24140e−03,
A10 = 2.44934e−03

9th surface

K = 0.000
A4 = −5.06133e−02, A6 = 5.36974e−03, A8 = 2.44905e−03,
A10 = −3.59220e−04

10th surface

K = −9.434
A4 = −5.61038e−02, A6 = 1.38799e−02, A8 = −3.24067e−03,
A10 = 2.79623e−04, A12 = 1.00000e−06, A14 = −1.00000e−06

EXAMPLE 2

| Unit mm | | | | |
|---|---|---|---|---|
| Surface data | | | | |
| Surface no. | r | d | nd | vd |
| Object plane | ∞ | ∞ | | |
| 1(S) | ∞ | −0.24 | | |
| 2* | 1.856 | 1.07 | 1.53367 | 55.87 |
| 3* | −5.641 | 0.05 | | |
| 4* | 53.010 | 0.35 | 1.61420 | 25.60 |
| 5* | 2.714 | 0.60 | | |
| 6* | −3.998 | 0.39 | 1.61700 | 27.20 |
| 7* | −5.540 | 0.57 | 1.52400 | 50.40 |
| 8* | −1.132 | 0.31 | | |
| 9* | −6.676 | 0.50 | 1.53367 | 55.87 |
| 10* | 1.553 | 0.60 | | |

-continued

Unit mm

| | | | | |
|---|---|---|---|---|
| 11 | ∞ | 0.30 | 1.51633 | 64.14 |
| 12 | ∞ | 0.33 | | |
| Image plane (Light receiving surface) | ∞ | 0 | | |

Aspherical surface data

2nd surface

K = −0.664
A4 = 4.66296e−03, A6 = −1.36071e−02, A8 = 1.86875e−02,
A10 = −2.06245e−02
3rd surface K = 0.385
A4 = −4.90249e−02, A6 = −2.06081e−02, A8 = 7.38367e−03,
A10 = −6.46151e−03
4th surface K = −0.006
A4 = −6.01656e−02, A6 = −1.75157e−02, A8 = 1.69188e−02,
A10 = 3.19289e−03
5th surface K = −0.418
A4 = 2.74177e−03, A6 = −1.43877e−03, A8 = −4.05819e−03,
A10 = 2.00314e−02, A12 = −5.18466e−03
6th surface K = 11.400
A4 = −8.33075e−04, A6 = −1.79773e−02, A8 = 9.93857e−03,
A10 = −1.63408e−03
7th surface K = 13.555
A4 = −4.59335e−03, A6 = −1.80069e−02, A8 = −1.14942e−02,
A10 = 1.11751e−02
8th surface K = −3.508
A4 = −5.93405e−02, A6 = 7.94457e−03, A8 = 8.39768e−04,
A10 = 9.37291e−04
9th surface K = 0.000
A4 = −5.07290e−02, A6 = 4.38140e−03, A8 = 2.80330e−03,
A10 = −3.93085e−04
10th surface K = −9.446
A4 = −5.47869e−02, A6 = 1.32154e−02, A8 = −3.18377e−03,
A10 = 2.81705e−04, A12 = 1.00000e−06, A14 = −1.00000e−06

EXAMPLE 3

Unit mm

Surface data

| Surface no. | r | d | nd | νd |
|---|---|---|---|---|
| Object plane | ∞ | ∞ | | |
| 1(S) | ∞ | −0.25 | | |
| 2* | 1.776 | 1.00 | 1.53367 | 55.87 |
| 3* | −11.786 | 0.06 | | |
| 4* | 16.683 | 0.35 | 1.61420 | 25.60 |
| 5* | 2.628 | 0.72 | | |
| 6* | −4.883 | 0.27 | 1.61700 | 27.20 |
| 7* | −19.594 | 0.54 | 1.52400 | 50.40 |
| 8* | −1.038 | 0.17 | | |
| 9* | −7.442 | 0.51 | 1.53367 | 55.87 |
| 10* | 1.387 | 0.60 | | |

-continued

Unit mm

| | | | | |
|---|---|---|---|---|
| 11 | ∞ | 0.30 | 1.51633 | 64.14 |
| 12 | ∞ | 0.53 | | |
| Image plane (Light receiving surface) | ∞ | 0 | | |

Aspherical surface data

2nd surface

K = −0.657
A4 = 7.83905e−03, A6 = −7.70433e−03, A8 = 1.71064e−02,
A10 = −1.65701e−02
3rd surface K = 0.082
A4 = −3.75783e−02, A6 = −2.83307e−02, A8 = 2.93728e−03,
A10 = −2.60012e−04
4th surface K = 0.649
A4 = −5.07674e−02, A6 = −2.78035e−02, A8 = 6.14931e−03,
A10 = 1.22851e−02
5th surface K = 0.951
A4 = 5.68456e−04, A6 = 6.36465e−03, A8 = −2.49656e−02,
A10 = 3.55404e−02, A12 = −5.18466e−03
6th surface K = 14.872
A4 = 2.01314e−03, A6 = 3.35717e−03, A8 = 2.08534e−03,
A10 = −1.76820e−03
7th surface K = 0.182
A4 = −4.89104e−02, A6 = −3.35508e−02, A8 = 1.45463e−02
8th surface K = −3.632
A4 = −2.82201e−02, A6 = 6.72065e−04, A8 = 1.37424e−02,
A10 = −3.93443e−03
9th surface K = 0.000
A4 = −3.52124e−02, A6 = −2.12477e−03, A8 = 4.16451e−03,
A10 = −5.21474e−04
10th surface K = −10.231
A4 = −5.78997e−02, A6 = 1.40719e−02, A8 = −3.32962e−03,
A10 = 2.85041e−04, A12 = 1.00000e−06, A14 = −1.00000e−06

EXAMPLE 4

Unit mm

Surface data

| Surface no. | r | d | nd | νd |
|---|---|---|---|---|
| Object plane | ∞ | ∞ | | |
| 1(S) | ∞ | −0.15 | | |
| 2* | 2.315 | 1.20 | 1.53367 | 60.87 |
| 3* | −6.270 | 0.08 | | |
| 4* | −58.293 | 0.35 | 1.61420 | 25.60 |
| 5* | 3.746 | 0.81 | | |
| 6* | −4.730 | 0.61 | 1.61700 | 27.20 |
| 7* | −5.093 | 0.66 | 1.52400 | 50.40 |
| 8* | −1.596 | 0.67 | | |
| 9* | −4.354 | 0.50 | 1.53367 | 55.87 |
| 10* | 2.797 | 0.82 | | |
| 11 | ∞ | 0.30 | 1.51633 | 64.14 |

-continued

Unit mm

| | | |
|---|---|---|
| 12 | ∞ | 0.34 |
| Image plane (Light receiving surface) | ∞ | 0 |

Aspherical surface data

2nd surface

K = −0.905
A4 = 1.32337e−03, A6 = −5.57899e−04, A8 = −1.43473e−03,
A10 = −2.22137e−03
3rd surface K = 1.862
A4 = −1.09219e−02, A6 = −8.04554e−03, A8 = −2.35317e−03,
A10 = −1.18504e−03
4th surface K = 0.002
A4 = −3.66422e−03, A6 = −2.01230e−03, A8 = −5.31835e−04,
A10 = 4.79498e−04
5th surface K = 4.335
A4 = 2.70899e−03, A6 = −1.13574e−03, A8 = −4.90260e−04,
A10 = 1.80836e−03, A12 = −1.62478e−04
6th surface K = 10.316
A4 = −7.27178e−03, A6 = −3.91332e−04, A8 = 1.54472e−03,
A10 = −1.16789e−03
7th surface K = −0.141
A4 = 1.42977e−03, A6 = −2.77270e−03, A8 = −6.35765e−04,
A10 = 3.11470e−05
8th surface K = −2.148
A4 = −2.89521e−04, A6 = −7.32016e−03, A8 = 2.30191e−03,
A10 = −2.24670e−04
9th surface K = 0.000
A4 = −7.12690e−03, A6 = −3.53107e−04, A8 = 3.55327e−04,
A10 = −2.23638e−05
10th surface K = −12.054
A4 = −2.27895e−02, A6 = 2.94208e−03, A8 = −4.26294e−04,
A10 = 2.18443e−05, A12 = −9.57743e−09, A14 = −1.59351e−08

EXAMPLE 5

Unit mm

Surface data

| Surface no. | r | d | nd | vd |
|---|---|---|---|---|
| Object plane | ∞ | ∞ | | |
| 1(S) | ∞ | −0.24 | | |
| 2* | 1.788 | 1.03 | 1.53367 | 55.87 |
| 3* | −8.947 | 0.05 | | |
| 4* | 37.841 | 0.35 | 1.61420 | 25.60 |
| 5* | 2.962 | 0.62 | | |
| 6* | −3.561 | 0.29 | 1.61700 | 27.20 |
| 7* | −4.294 | 0.60 | 1.52400 | 50.40 |
| 8* | −0.974 | 0.10 | | |

-continued

Unit mm

| | | | | |
|---|---|---|---|---|
| 9* | −21.383 | 0.52 | 1.53367 | 55.87 |
| 10* | 1.192 | 0.60 | | |
| 11 | ∞ | 0.30 | 1.51633 | 64.14 |
| 12 | ∞ | 0.59 | | |
| Image plane (Light receiving surface) | ∞ | 0 | | |

Aspherical surface data

2nd surface

K = −0.717
A4 = 5.41868e−03, A6 = 7.11784e−04, A8 = 6.31601e−03,
A10 = −1.57879e−02
3rd surface K = 1.447
A4 = −5.82913e−02, A6 = −3.17970e−02, A8 = 4.34054e−03,
A10 = 2.33570e−03
4th surface K = −0.013
A4 = −6.59541e−02, A6 = −2.74697e−02, A8 = −3.29402e−03,
A10 = 2.53063e−02
5th surface K = 0.568
A4 = 1.04789e−02, A6 = −1.26990e−02, A8 = −4.40329e−03,
A10 = 2.10703e−02, A12 = −5.00015e−03
6th surface K = 9.279
A4 = 2.04861e−02, A6 = 1.50804e−02, A8 = −1.57867e−02,
A10 = 9.10052e−03, A12 = −1.66094e−03
7th surface K = 0.418
A4 = −2.22894e−02, A6 = −1.09510e−02
8th surface K = −3.758
A4 = −2.84590e−02, A6 = −2.51788e−03, A8 = 1.42327e−02,
A10 = −3.83965e−03, A12 = 2.13172e−05
9th surface K = 0.000
A4 = −5.12228e−02, A6 = 1.95939e−03, A8 = 3.64575e−03,
A10 = −5.41573e−04, A12 = 4.33386e−06
10th surface K = −9.213
A4 = −6.09156e−02, A6 = 1.43598e−02, A8 = −3.33029e−03,
A10 = 3.02825e−04, A12 = −3.58157e−06, A14 = −1.00000e−06

Further, value of conditional expression in each of the examples are shown below:
Value of conditional expression

| | Example 1 | Example 2 | Example 3 |
|---|---|---|---|
| ν3 − ν4 | 23.2 | 23.2 | 23.2 |
| f3/f4 | −12.75 | −9.92 | −5.13 |
| f1/f34 | 1.04 | 1.01 | 1.23 |
| (r6 + r8)/(r6 − r8) | 1.75 | 2.00 | 1.54 |
| f1/f | 0.66 | 0.66 | 0.69 |
| f5/f | −0.55 | −0.55 | −0.50 |
| d5/TL | 0.91 | 0.91 | 0.84 |

| | Example 4 | Example 5 |
|---|---|---|
| ν3 − ν4 | 23.2 | 23.2 |
| f3/f4 | −72.05 | −17.66 |
| f1/f34 | 0.83 | 1.26 |
| (r6 + r8)/(r6 − r8) | 2.02 | 1.75 |

| | | |
|---|---|---|
| f1/f | 0.61 | 0.68 |
| f5/f | −0.57 | −0.50 |
| d5/TL | 0.90 | 0.84 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 11:
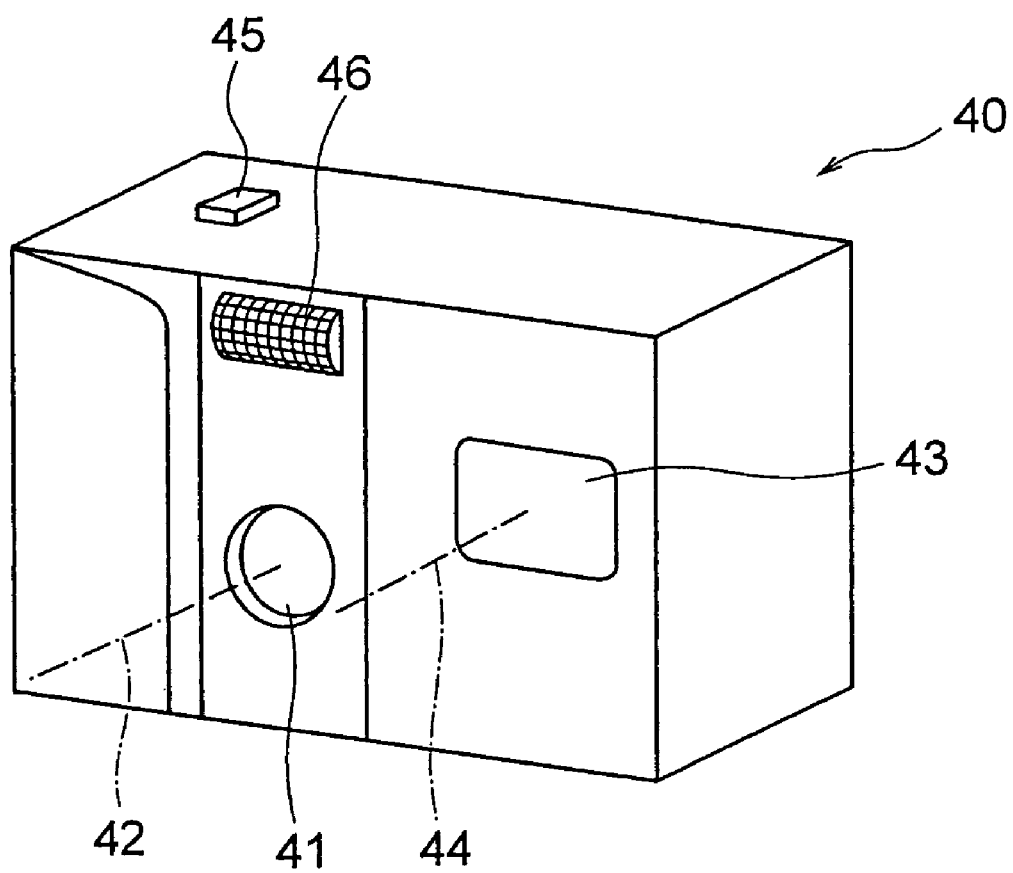
FIG. 11 is a front perspective view showing an appearance of a digital camera 40 in which, an image pickup optical system according to the present invention is incorporated.
Figure 12:
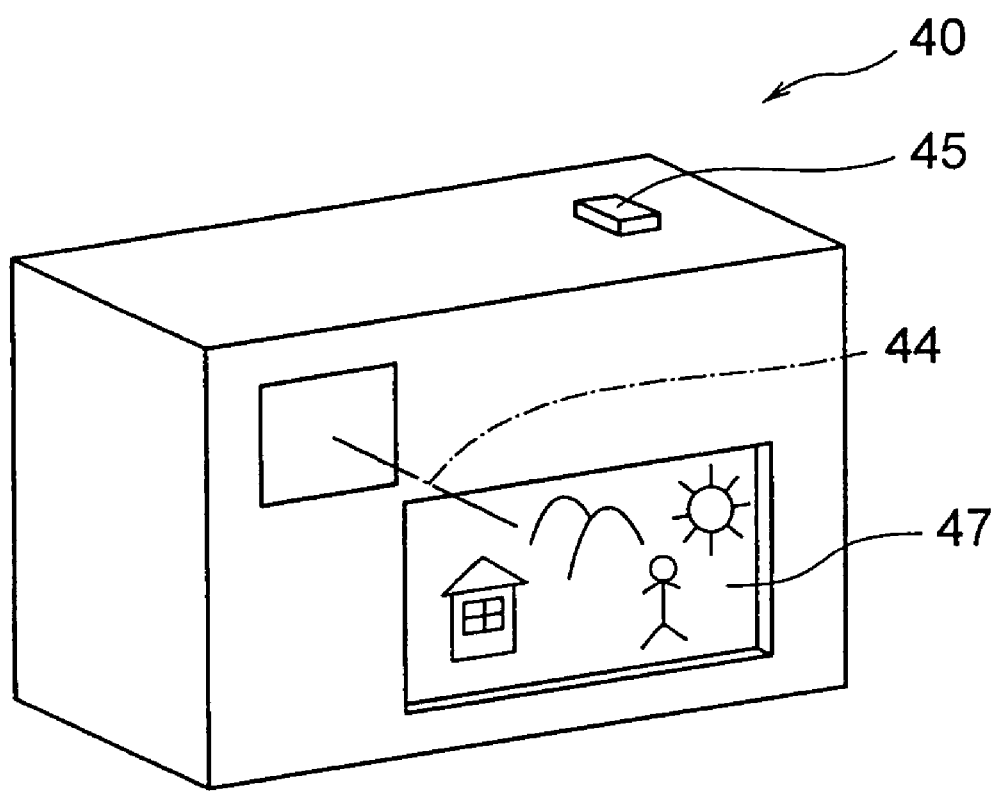
FIG. 12 is a rear perspective view of the digital camera 40.
Figure 13:
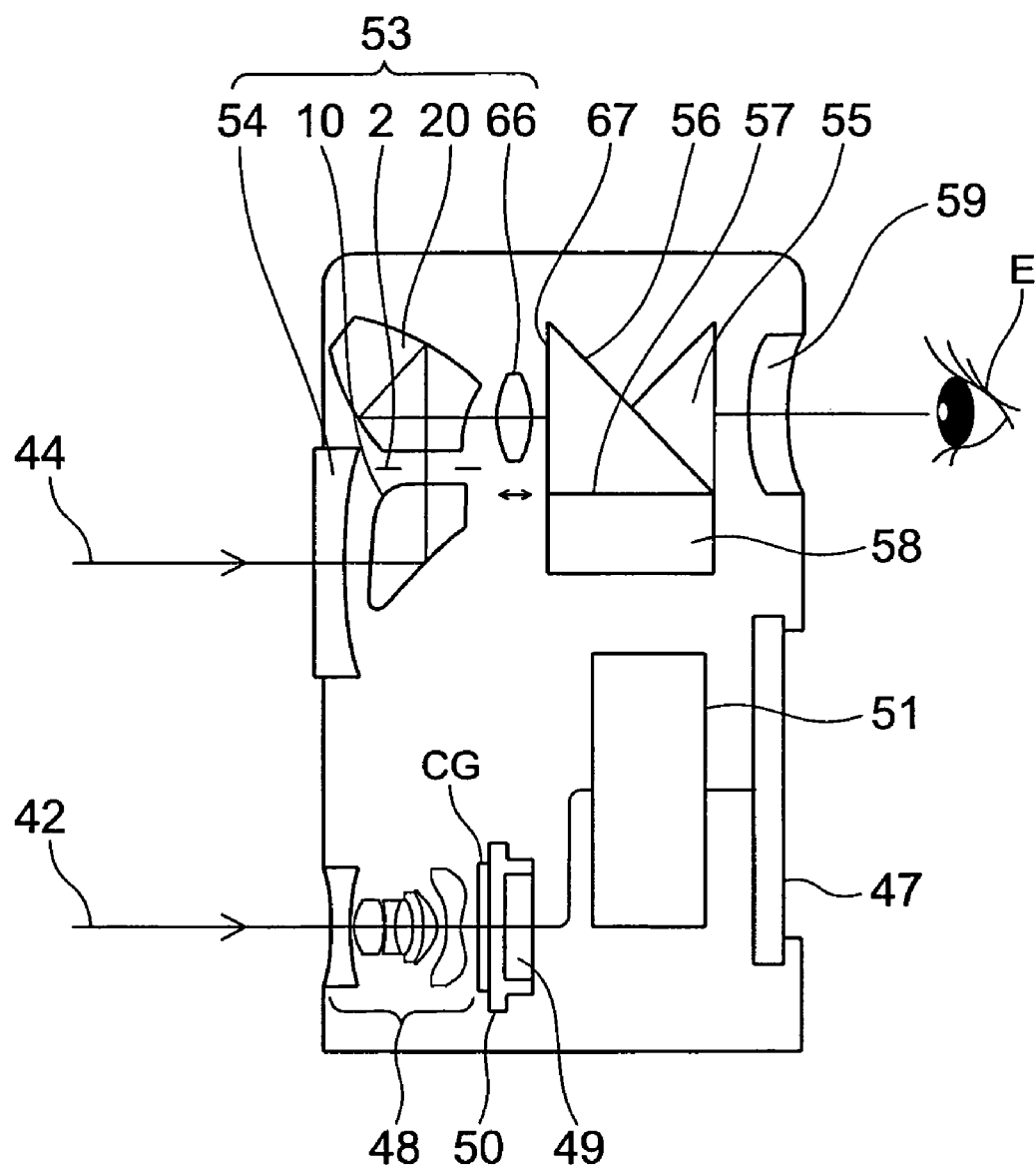
FIG. 13 is a cross-sectional view showing an optical arrangement of the digital camera 40.

In FIG. 11 to FIG. 13 show conceptual diagrams of structures in which the image forming optical system according to the present invention is incorporated in a photographic optical system 41 of a digital camera. FIG. 11 is a frontward perspective view showing an appearance of a digital camera 40, FIG. 12 is a rearward perspective view of the same, and FIG. 13 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Although an image pickup optical system of a collapsible digital camera shown in the diagram has a lens cross-sectional arrangement which differs from the lens cross-sectional arrangement in each of the embodiments above, the image pickup optical system same as in the embodiments described above is installed in the digital camera.

Figure 14:
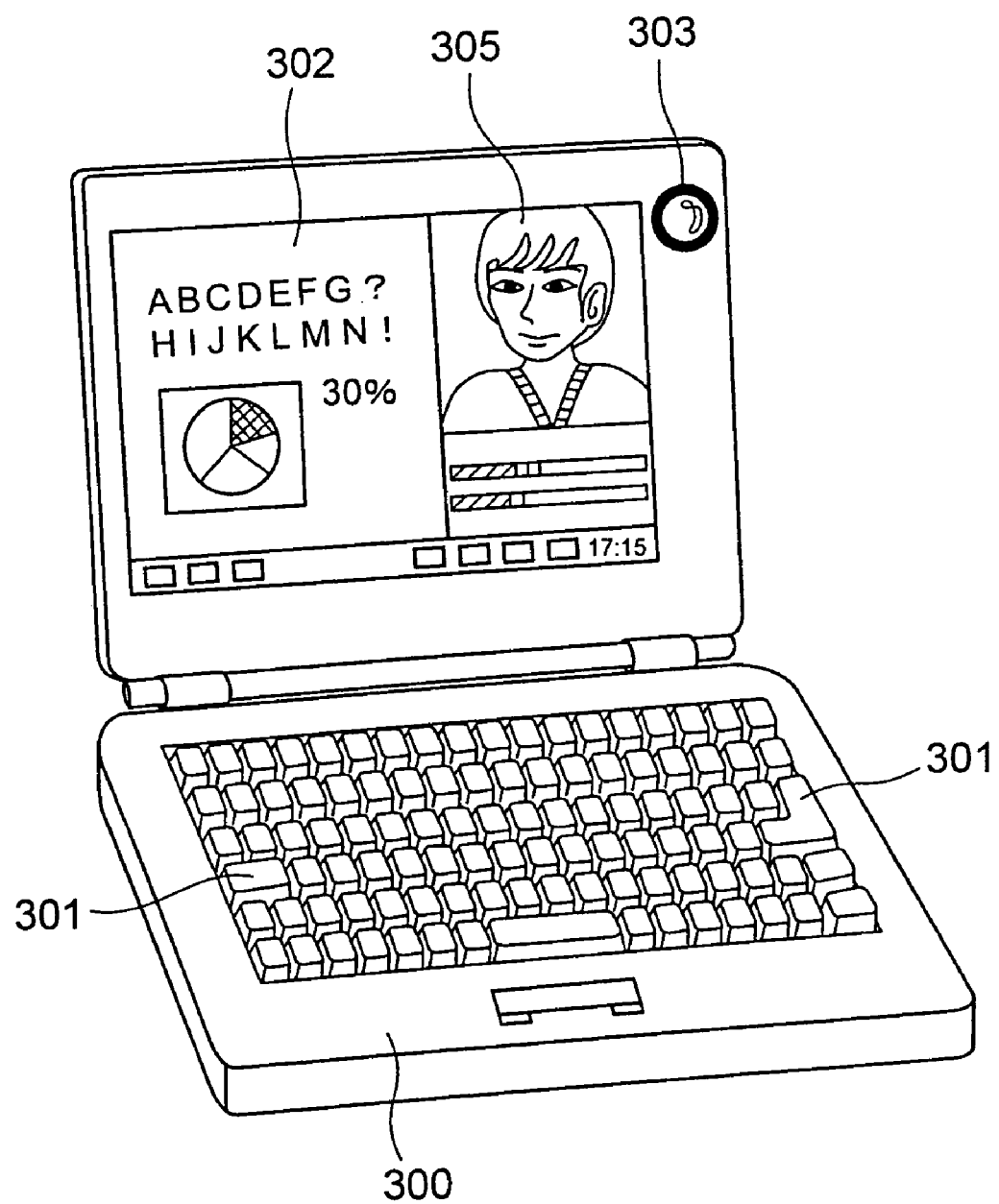
FIG. 14 is a front perspective view of a state in which, a cover of a personal computer 300 which is an example of an information processing apparatus in which, the image pickup optical system of the present invention has been built-in as an objective optical system, is opened.
Figure 15:
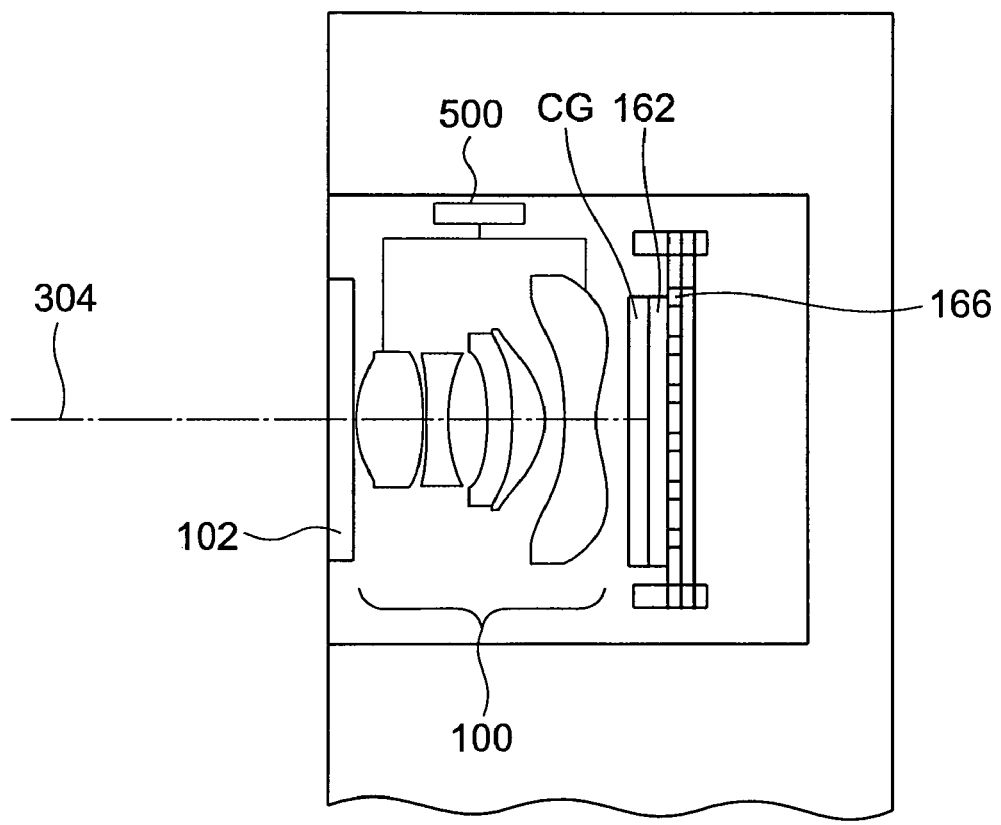
FIG. 15 is a cross-sectional view of a photographic optical system 303 of the personal computer 300.
Figure 16:
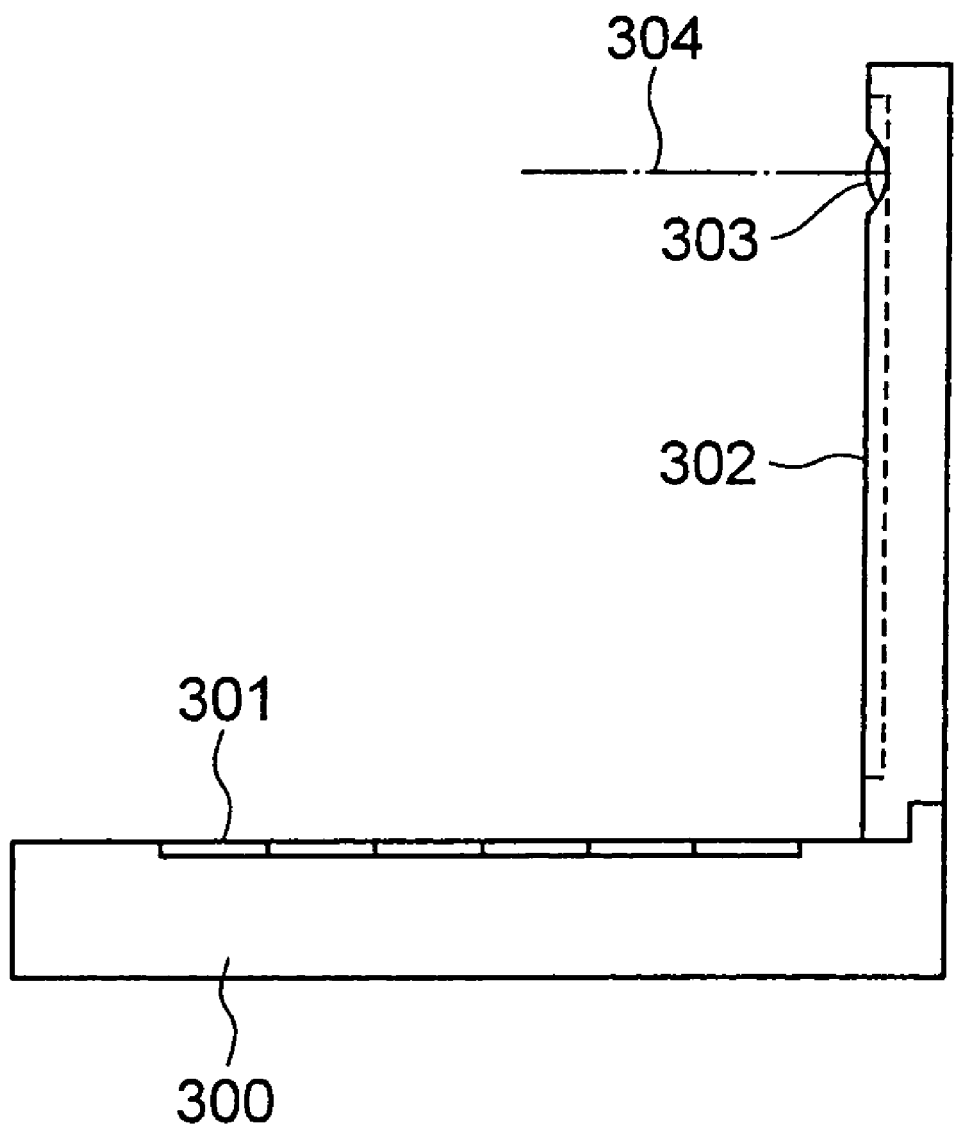
FIG. 16 is a side view of the personal computer 300.

Next, a personal computer which is an example of an information processing apparatus with a built-in image forming system as an objective optical system is shown in FIG. 14 to FIG. 16. FIG. 14 is a frontward perspective view of a personal computer 300 with its cover opened, FIG. 15 is a cross-sectional view of a photographic optical system 303 of the personal computer 300, and FIG. 16 is a side view of FIG. 14. As it is shown in FIG. 14 to FIG. 16, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display. As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

Although an image pickup optical system of a personal computer shown in the diagram has a lens cross-sectional arrangement which differs from the lens cross-sectional arrangement in each of the embodiments described above, the image pickup optical system same as in the embodiments described above is installed in the personal computer.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 14, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

The image pickup apparatus 303 includes an auto-focus mechanism 500 which is integrated with an objective optical system 100 (image pickup optical system). By installing the auto-focus mechanism 500, it is possible to focus at any object distance.

Moreover, it is desirable that the objective optical system 100 (image pickup optical system) and an electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image by αi, it is possible to provide a personal computer (an image pickup apparatus) having a small size and an improved performance.

Figure 17A:
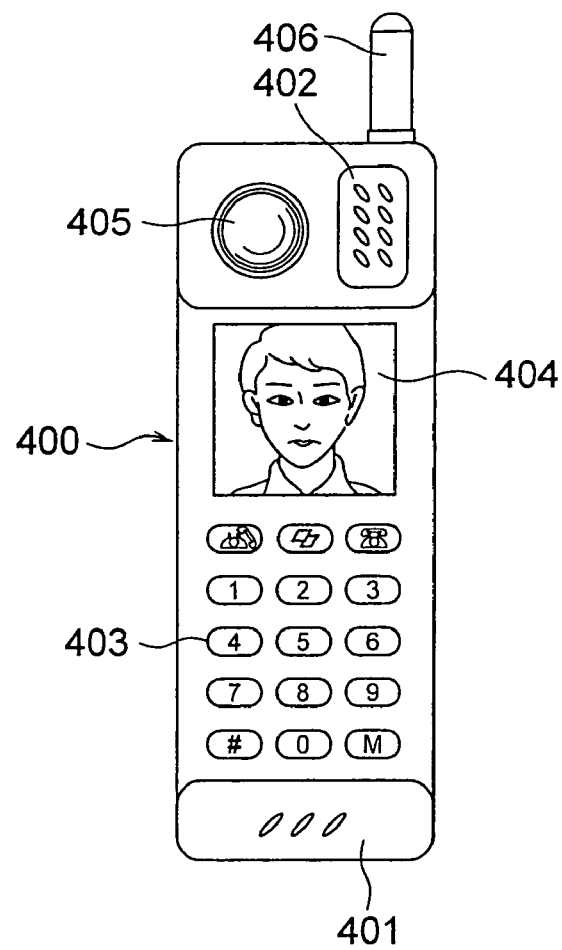
FIG. 17A is a front perspective view of a mobile telephone 400 which is an example of an information processing apparatus in which, the image pickup optical system of the present invention has been built-in as a photographic optical system.
Figure 17B:
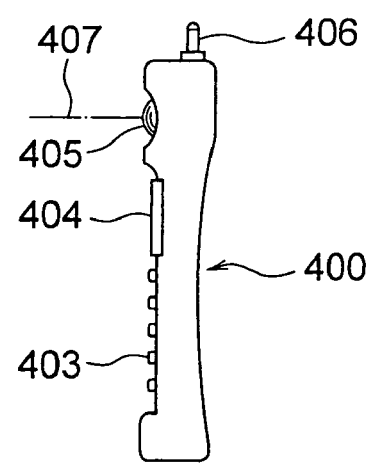
FIG. 17B is a side view of the mobile telephone 400.
Figure 17C:
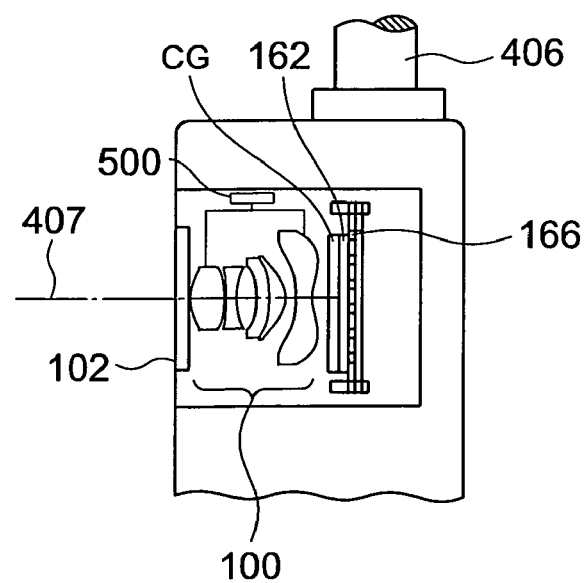
FIG. 17C is a cross-sectional view of a photographic optical system 405.

Next, a telephone which is an example of an information processing apparatus in which the image forming optical system of the present invention is built-in as a photographic optical system, particularly a portable telephone which is easy to carry is shown in FIG. 17A, FIG. 17B, and FIG. 17C. FIG. 17A is a front view of a portable telephone 400, FIG. 17B is a side view of the portable telephone 400, and FIG. 17C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used. These are built into the portable telephone 400.

At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Although an image pickup optical system of an information processing apparatus shown in the diagram has a lens cross-sectional arrangement which differs from the lens cross-sectional arrangement in each of the embodiments above, the image pickup optical system same as in the embodiments described above is installed in the information processing apparatus.

Moreover, the image pickup apparatus includes the auto-focus mechanism 500 which is integrated with the objective optical system 100 (image pickup optical system). By installing the auto-focus mechanism 500, it is possible to focus at any object distance.

Furthermore, it is desirable that the objective optical system 100 (image pickup optical system) and the electronic image pickup element chip 162 (electronic image pickup element) are integrated.

By integrating the electronic image pickup element, it is possible to convert an optical image captured by the image pickup optical system to an electric signal. Moreover, by selecting an electronic image pickup element which is capable of reducing a change in a brightness of an image in a central portion and a peripheral portion of the image by αi, it is possible to provide a mobile telephone (an image pickup apparatus) having a small size and an improved performance.

The present invention can have various modifications which fairly fall within the basic teaching herein set forth.

As it has been described above, the present invention is useful for an image pickup optical system having a small size and an improved performance.

According to the present invention, there is shown an effect that it is possible to provide a small-size image pickup optical system which is a bright optical system and in which, various aberrations are corrected favorably, and an image pickup apparatus in which, such image pickup optical system is used.

What is claimed is:

1. An image pickup optical system having five lenses, comprising in order from an object side:
   a first lens having a biconvex shape, and a positive refractive power;
   a second lens having a negative refractive power;
   a third lens having a meniscus shape with a concave surface thereof directed toward the object side, and a negative refractive power;
   a fourth lens having a meniscus shape with a concave surface thereof directed toward the object side, and a positive refractive power; and
   a fifth lens having a negative refractive power, wherein
   the third lens and the fourth lens are cemented, and
   the negative refractive power at a central portion of the third lens increases gradually toward a peripheral portion thereof, and
   the positive refractive power at a central portion of the fourth lens decreases gradually toward a peripheral portion thereof, and
   a cemented surface of the third lens and the fourth lens is an aspheric surface, and the cemented surface becomes a concave surface all the time with respect to the object side, at the central portion and the peripheral portion.

2. The image pickup optical system according to claim 1, where in the image pickup optical system satisfies the following conditional expression $$2.5 < |f3/f4| < 100 \tag{1}$$

where,
f3 denotes a focal length of the third lens, and
f4 denotes a focal length of the fourth lens.

3. The image pickup optical system according to claim 1, wherein a diaphragm is disposed nearest to the object side of the image pickup optical system.

4. The image pickup optical system according to claim 1, wherein the image pickup optical system satisfies the following conditional expression $$0.4 < f1/f34 < 2.5 \tag{2}$$

wherein,
f34 denotes a combined focal length of the third lens and the fourth lens, and
f1 denotes the focal length of the first lens.

5. The image pickup optical system according to claim 1, wherein a curvature of the cemented surface of the third lens and the fourth lens which are cemented, is a shape which increases toward the peripheral portion as compared to a paraxial region.

6. The image pickup optical system according to claim 1, wherein the cemented surface of the third lens and the fourth lens which are cemented, has a point of inflection.

7. The image pickup optical system according to claim 1, wherein the image pickup optical system satisfies the following conditional expression $$0.75 < (r6+r8)/(r6-r8) < 4.0 \quad (3)$$

where,
r6 denotes a radius of curvature of a surface on the object side of the third lens, and
r8 denotes a radius of curvature of a surface on an image side of the fourth lens.

8. The image pickup optical system according to claim 1, wherein the image pickup optical system satisfies the following conditional expression $$0.3 < f1/f < 1.4 \quad (4)$$

where,
f1 denotes a focal length of the first lens, and
f denotes a focal length of the overall image pickup optical system.

9. The image pickup optical system according to claim 1, wherein the image pickup optical system satisfies the following conditional expression $$0.25 < |f5/f| < 1.15 \quad (5)$$

where,
f5 denotes a focal length of the fifth lens, and
f denotes a focal length of the overall image pickup optical system.

10. The image pickup optical system according to claim 1, wherein the image pickup optical system satisfies the following conditional expression $$0.4 < d5/TL < 1.8 \quad (6)$$

where,
TL denotes a distance on an optical axis, from a vertex of a surface on the object side of the first lens up to a vertex of a surface on an image side of the fifth lens, and
d5 denotes an air space on the optical axis, between the second lens and the third lens.

11. An image pickup apparatus comprising:
an image pickup optical system according to claim 1; and
an electronic image pickup element having an image pickup surface, wherein
the image pickup optical system has an auto-focus mechanism integrated therein.

12. The image pickup apparatus according to claim 11, wherein the image pickup optical system and the electronic image pickup element are integrated.

* * * * *